March 29, 1966     D. D. BERCKHAN     3,243,007
WHEEL SUSPENSION FOR DRIVEN STEERABLE WHEELS
Filed May 9, 1961     4 Sheets-Sheet 1
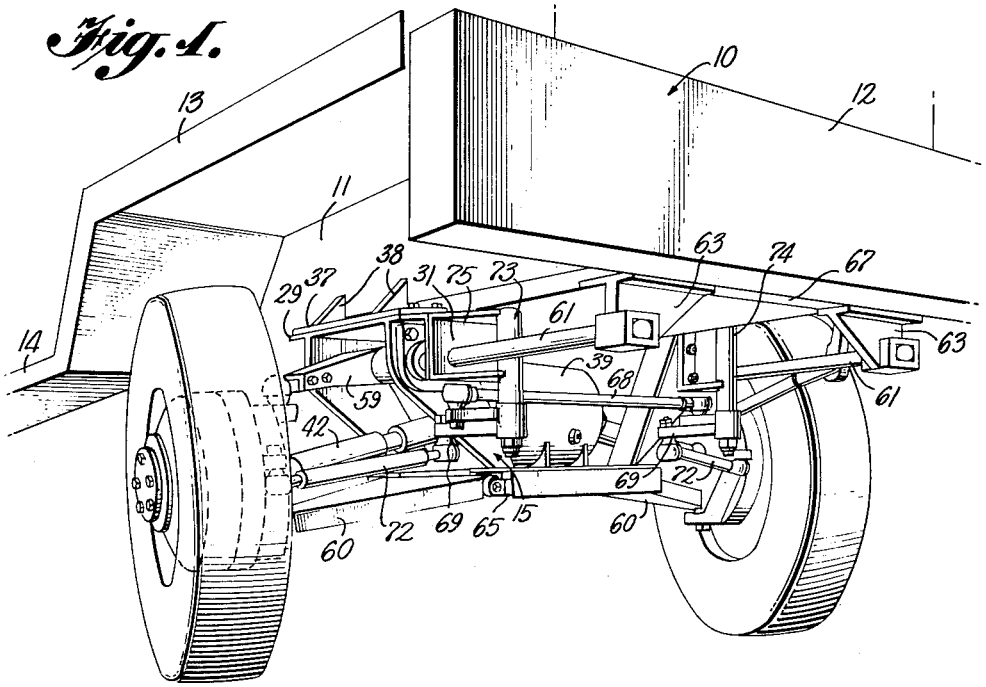
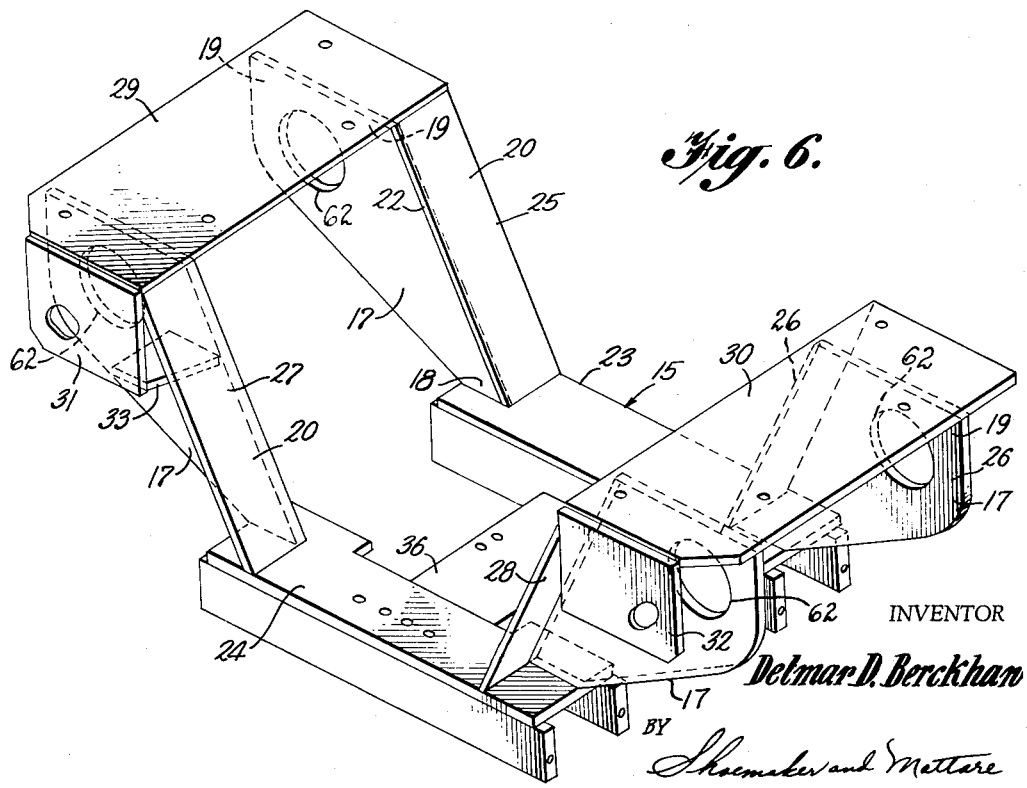
INVENTOR
Delmar D. Berckhan
BY
Shoemaker and Mattare
ATTORNEYS

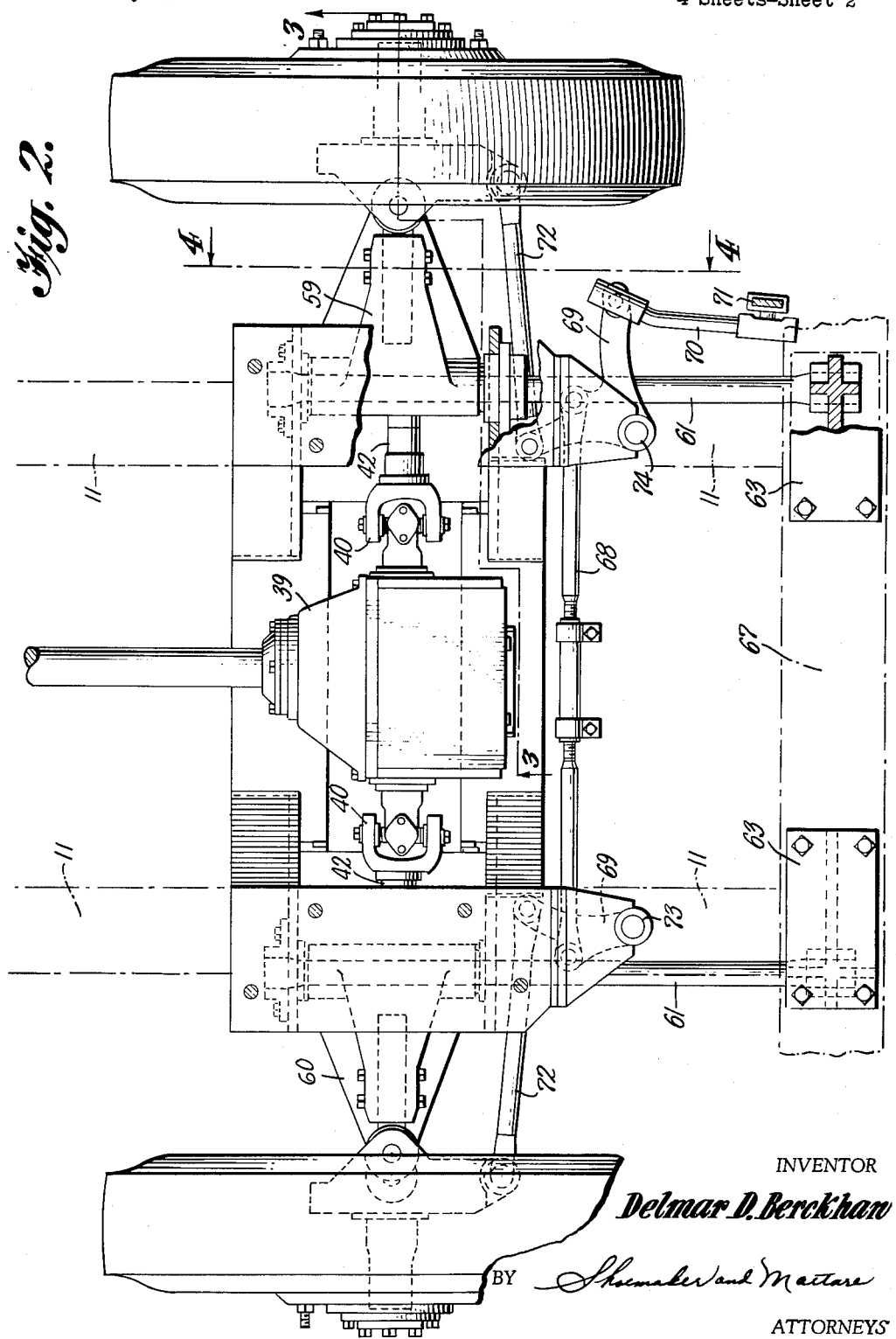

March 29, 1966   D. D. BERCKHAN   3,243,007
WHEEL SUSPENSION FOR DRIVEN STEERABLE WHEELS
Filed May 9, 1961   4 Sheets-Sheet 3

INVENTOR
*Delmar D. Berckhan*
BY *Shoemaker and Mattare*
ATTORNEYS

March 29, 1966     D. D. BERCKHAN     3,243,007
WHEEL SUSPENSION FOR DRIVEN STEERABLE WHEELS
Filed May 9, 1961     4 Sheets-Sheet 4
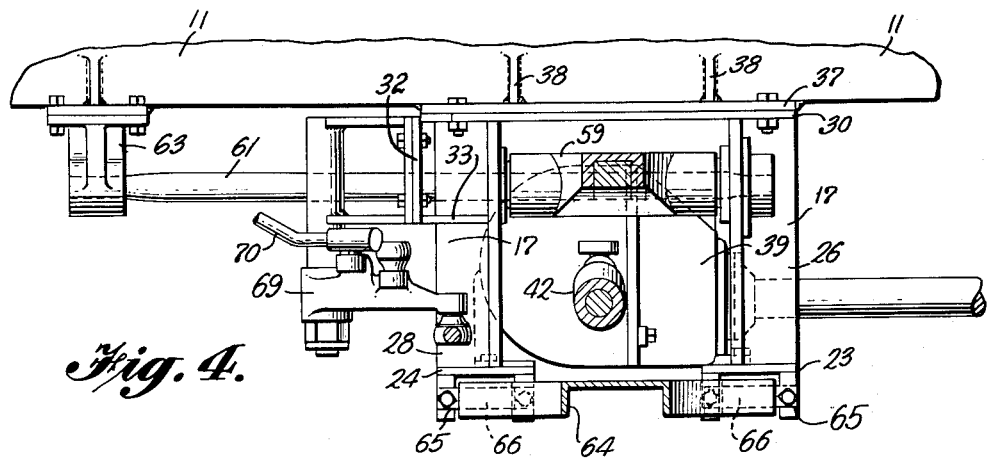
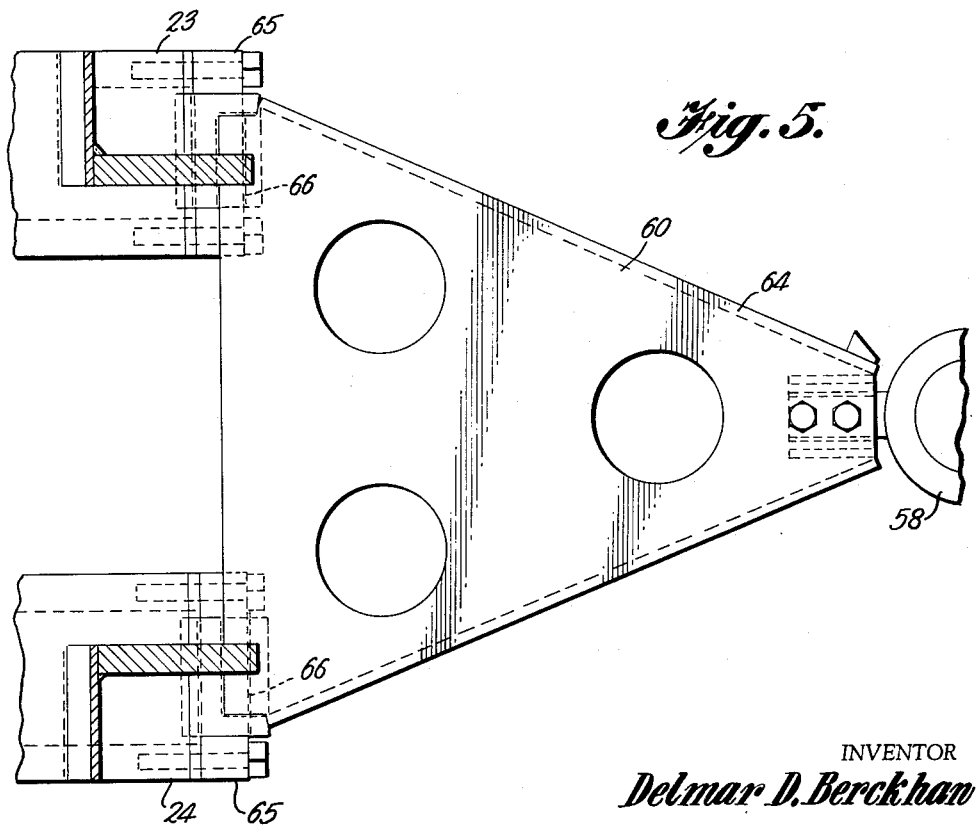
INVENTOR
*Delmar D. Berckhan*
BY *Shoemaker and Mattare*
ATTORNEYS United States Patent Office 3,243,007
Patented Mar. 29, 1966

3,243,007
WHEEL SUSPENSION FOR DRIVEN
STEERABLE WHEELS
Delmar D. Berckhan, Waverly, Iowa, assignor, by mesne assignments, to Koehring Company, Milwaukee, Wis., a corporation of Wisconsin
Filed May 9, 1961, Ser. No. 108,779
7 Claims. (Cl. 180—43)

The present invention relates to a device for motor vehicles, and more particularly to a wheel suspension for said vehicles including a frame construction therefor.

It is an object of the present invention to provide a wheel suspension for a vehicle in which the wheels may be driver wheels or driven wheels.

Another object of the present invention is to provide a novel frame construction for suspending the wheels of a vehicle therefrom, in which the frame construction may be readily secured to the vehicle frame and may be easily disassembled therefrom.

It is another object of the present invention to provide a novel header member for suspending the wheels of a vehicle therefrom, which header member is a cradle-like structure.

It is another object of the present invention to provide a header member for suspending the wheels of a vehicle therefrom, which header member acts as a rigid transverse strut for connecting the wheels to the frame of the vehicle.

It is another object of the present invention to provide a header member for suspending the drive or driven wheels of a vehicle thereto, which header member permits subsequent installation of the driving mechanism and which header member may be disassembled from the vehicle frame without requiring removal of the vehicle engine therefrom.

It is another object of the present invention to provide a header member that is composed of a plurality of spaced rigid support members and a transverse plate member permanently connected to each other so as to support or suspend the wheels of a vehicle therefrom.

It is another object of the present invention to provide a header standard that forms a cradle-like structure which supports the differential gear mechanism between the wheels so that the axle which turns or drives the wheel suspended from the header standard is in substantial alignment with the axis of the wheel.

It is another object of the present invention to provide a differential that is sprung weight and carries only radial loading whereas other types carry full radial drive loads as well as torsional and longitudinal wheel suspension from drive contact with the road.

Another feature of the present invention is the provision of a header standard for suspending the wheels of a vehicle therefrom which permits no transmission of wheel loading to the differential case between the wheels.

Another object of the present invention is to provide a header standard for suspending the wheels of a vehicle therefrom in which all wheel action is absorbed by the flexible universal joints in the wheel drive shaft and by the torsion bar and suspension arms.

Another object of the present invention is to provide a header standard for suspending the front wheels of a vehicle therefrom which can be used equally well with or without a front wheel drive.

Various other objects and advantages of the present invention will be readily apparent from the following detailed description when considered in connection with the accompanying drawings forming a part thereof and in which:

FIG. 1 is a perspective view of a vehicle embodying the wheel suspension of the present invention;

FIG. 2 is a top plan view of the wheel suspension of the present invention;

FIG. 4 is a fragmentary side section of the wheel suspension embodied in the present invention taken along lines 4—4 of FIG. 2;

FIG. 5 is a top plan detail view of the lower suspension member or control arm associated with the header standard embodied in the present invention; and FIG. 6 is an enlarged perspective view illustrating the header standard embodied in the wheel suspension of the present invention.

Figure 3:
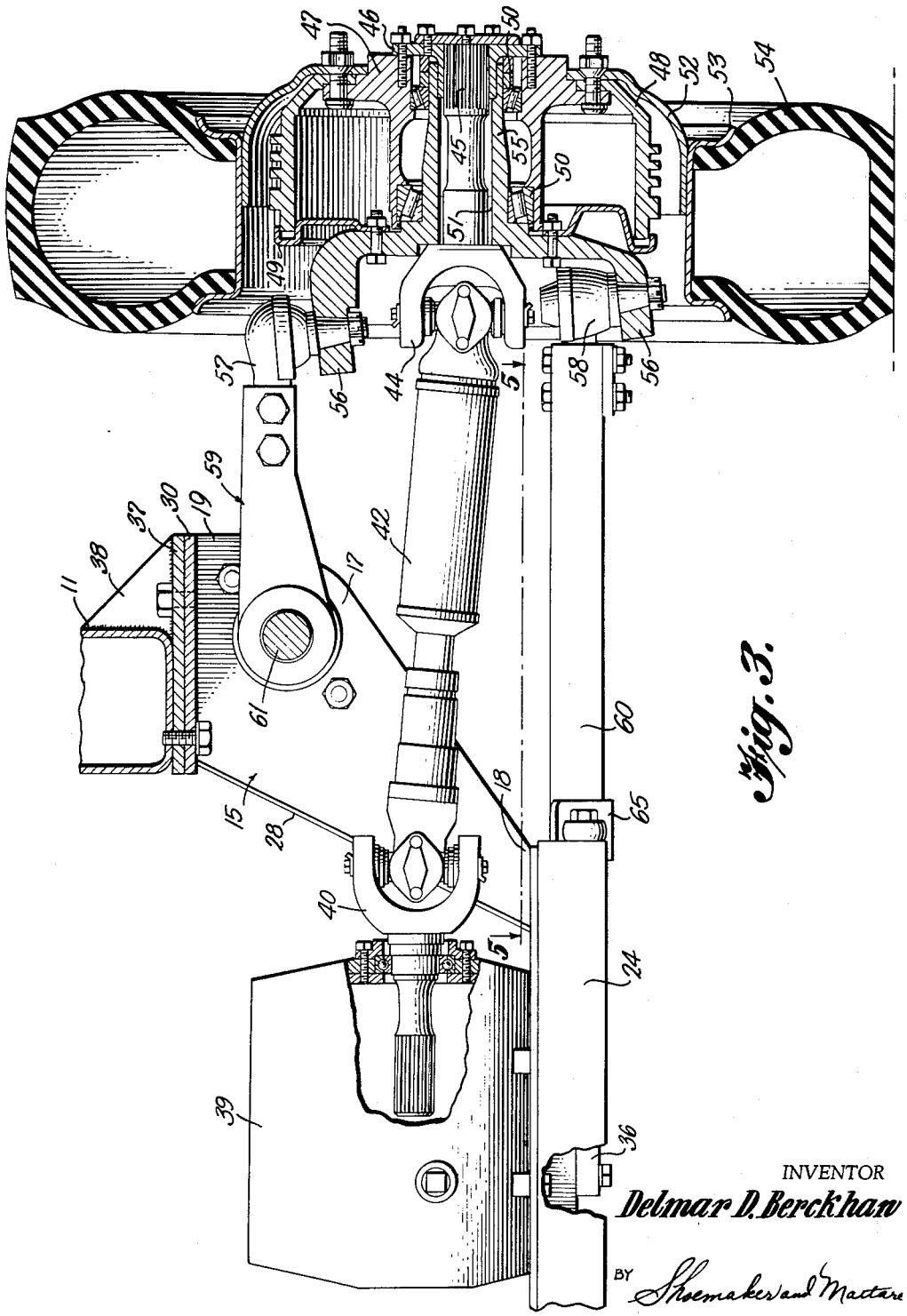
FIG. 3 is a fragmentary transverse sectional view of the wheel suspension of the present invention taken along lines 3—3 of FIG. 2.

Referring to the drawings, the reference numeral 10 generally designates a motor vehicle provided with spaced longitudinally extending frame members 11 forming part of the frame or chassis of the vehicle. The frame members comprise hollow rectangular bars or steel channels and extend substantially the length of the vehicle to a point adjacent the front and rear bumpers or guard rails, only one of which bumpers, the front bumper 12, is illustrated. The body portion of the vehicle, including the wheel guard or fender 13 and the cab step 14 for entrance to the cab of a vehicle, is generally disposed above or adjacent the frame members 11.

Fixed to the bottom or lower side of members 11 is a header standard or header member generally designated 15. The header member as clearly shown in FIG. 6, comprises a cradle-like structure with four upwardly and outwardly extending vertical support struts 25, 26, 27 and 28. Each strut comprises a relatively wide vertically extending section or member 17 having a narrow horizontal lower end 18 and a relatively wide horizontal upper end 19, and a longitudinally extending inclined rectangular section 20 joined at right angles to section 17. The inclined section 20 of rear struts 25, 26 are joined along their front edges to the inner sides of sections 17, while the sections 20 of front struts 27, 28 are joined along their rear edges to sections 17. The lower ends of the rear support struts 25, 26 and of the forward support struts 27, 28 are welded, respectively, to the top of spaced rearward and forward transverse box plates 23 and 24. The pair of rear support struts 25 and 26 are disposed on the opposite ends of the rear transverse plate 23, while the forward pair of support struts 27 and 28 are oppositely disposed on the front transverse plate 24, as clearly illustrated in FIG. 6. The front end or portion of the header member 15 which includes the plate 24 and struts 27 and 28, is substantially identical to the rear end of the header member which includes plate 23 and support struts 25 and 26. The upper ends of struts 25 and 27 in longitudinal alignment on one side of the header member, and the upper ends of struts 26 and 28 in longitudinal alignment on the other side of the header member are rigidly joined together respectively, by substantially horizontal longitudinal flat plates 29 and 30 extending therebetween, to which they are welded. Plates 29 and 30 extend beyond sections 17 of struts 25, 27 and 26, 28, respectively, to points coextensive with sections 20. Small vertical members 31 and 32 are welded to the front end of plates 29 and 30 respectively, and have gussets 33 bracing their lower ends. A horizontal rectangular pad member 36 extends between the side transverse plates 23 and 24 and is rigidly secured thereto. The transverse plates 23 and 24 form U-shaped channel members or blocks.

Thus, it will be seen that the header member provides a rigid one-piece structure from which the front wheel assemblies are suspended as hereinafter described. It will also be noted that the header member, in turn, is rigidly secured to the longitudinal vehicle frame members 11 (see FIGS. 1, 3) by bolting the flat plates 29 and 30 to flat plate members 37 which, in turn, are welded through angle brackets 38 to the frame members 11. Of course, if desired, the flat plates 29 and 30 could be bolted directly to the frame members but it is found that this is a more convenient method of doing so.

A differential housing 39 is supported by the header member 15 and is secured thereto by bolts to plate 24 and the pad so that it rests on pad 36 (see FIGS. 2 and 3) and the header member provides a cradle-like structure for carrying the differential housing. Yoke members or universal joint assemblies 40 (see FIGS. 2, 3) are connected to both sides of the differential housing and to the inner end of intermediate wheel drive shafts 42 which have their outer ends connected to outer universal joints or yoke members 44. Universal members 44, in turn, are disposed on the inner end of the short wheel shaft or spindle 45 (see FIG. 3) which is splined to hub driving flange 46, in turn bolted to the wheel hub 47. The wheel hub is supported on bearings 50 and is provided with a conventional brake drum 48 and brake assembly 49. A disc wheel 52 with a rim 53 and tire 54 are associated with the driven hub 47 in the usual manner.

A spindle sleeve 55 (see FIG. 3) covers the wheel shaft 45 and has inwardly extending lugs or ears 56 (see FIG. 3) on the inner end thereof. A pilot bearing 51 in the sleeve supports the wheel shaft 45 therein. The lugs 56 are disposed vertically above each other and have upper and lower ball socket housings 57 and 58 connected to them. The upper socket housings 57 are connected to the outer end of the upper wheel suspension arms 59, while the lower socket housings 58 are connected to the lower suspension or control arms 60 (see FIG. 3). The upper and lower suspension or control arms are connected through the ball socket housings so that the entire wheel assembly can be turned or pivoted about these points.

The inner ends of upper control arms 59 are fixedly secured to horizontal torsion bars 61 which extend longitudinally through openings 62 in plates 17 and openings in gussets 31 and 32 of the header member 15. The front end of the torsion bars 61 are fixedly secured to front transverse support brackets 63 fixed in front of frame members 11 (see FIG. 1) to a transverse beam 67 (see FIGS. 1, 2) extending between members 11.

It will be noted that the inner end of the arm 59 is connected to the torsion rod 61 between the front and rear support struts 28 and 26, so that the cradle or header member carries the load.

The lower control arm 60 comprises a perforated A-shaped horizontal plate 64 having its wider end pivotally connected to the side of the header member 15. This connection is accomplished by lug means 65 connected through bolts to the rear and front transverse plates 23 and 24, with the inner end of the A-shaped plate 64 being provided with pins 66 disposed in the lugs 65 (see FIG. 4). The pins are preferably journalled in rubber bushings.

The vehicle is provided with a steering mechanism not forming a part of the invention, including the transverse linkage 68, the bell crank mechanisms 69 and steering linkage 70 connected to the steering arm column 71. The bell crank mechanism 69 is connected to the vehicle wheels through wheel links 72 (FIG. 1). The entire steering mechanism is supported by vertical posts 73 and 74 welded to angle brackets 75, in turn secured to the underside of frame members 11.

Thus, the present invention provides a novel header standard or member comprising a cradle-like structure which encloses the differential housing of a vehicle, and which standard further has extending therefrom upper and lower wheel suspension arms so that the assembly has a drive shaft or a driven shaft in alignment with the axis of the wheels, and which structure further permits easy disassembly of the parts, and which parts may be connected to the vehicle frame without requiring any removal of the engine parts or transmission associated with such vehicles.

If it is desired that the wheels not be driven, the inner universal joint 40, the intermediate shaft 42 and the universal joint 44 at the wheel and the stub wheel shaft 45 may not be used, or if installed, may be readily removed.

It will also be observed that the cradle arrangement or header standard of the present invention permits the addition of a driving mechanism to the front wheels of a vehicle.

Inasmuch as various changes may be made in the form, location and relative arrangement of the several parts without departing from the essential characteristics of the invention, it will be understood that the invention is not to be limited except by the scope of the appended claims.

I claim:

1. A wheel suspension assembly for a vehicle comprising a header member forming a cradle structure, including pairs of spaced vertical support struts, transverse plates extending between the lower ends of each pair of struts, a longitudinal pad extending between said transverse plates, longitudinal torsion rods extending through said struts and being pivotally supported therein, an upper wheel control arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing disposed on and carried by said header member, yoke members connected to said housing, intermediate wheel drive shafts connected to said yoke members, and wheel drive means connected to said intermediate shafts for driving the wheels of the vehicle whereby said drive means may be readily removed therefrom.

2. A wheel suspension assembly for a vehicle comprising a header member forming a cradle structure provided by spaced pairs of opposed upwardly and outwardly extending support struts and transverse plates extending between the lower ends of each said pair of support struts, a pad member extending between said transverse plates, longitudinal torsion rods extending through said struts and being pivotally supported therein, an upper wheel control arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing disposed on and carried by said header member, yoke members connected to said housing, intermediate wheel drive shafts connected to said yoke members, and wheel drive means connected to said intermediate shafts for driving the wheels of the vehicle whereby said drive means may be readily removed therefrom.

3. In a motor vehicle, a frame for supporting the vehicle, a header member forming a cradle structure, including pairs of spaced vertical support struts, transverse plates extending between the lower ends of each pair of struts, a longitudinal pad extending between said transverse plates, the upper end of said vertical support struts being secured to said frame, longitudinal torsion rods extending through said struts and being pivotally supported therein, an upper wheel contol arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing carried by said vehicle header member, yoke members connected to said differential housing, and wheel drive means connected to said yoke members for driving the wheels of the vehicle whereby said drive means may be readily disconnected from the wheels.

4. In a motor vehicle, spaced frame members for supporting the vehicle, a header member forming a cradle structure provided by spaced pairs of opposed upwardly and outwardly extending support struts and transverse plates extending between the lower ends of each said pair of support struts, a pad member extending between said transverse plates, the support struts on one side of said transverse plates being secured to one of said frame members and the support struts on the opposite side of said transverse plates being secured to another frame member, longitudinal torsion rods extending through said struts and being pivotally supported therein, an upper wheel control arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing carried by said vehicle header member, yoke members connected to said differential housing, and wheel drive means connected to said yoke members for driving the wheels of the vehicle whereby said drive means may be readily disconnected from the wheels.

5. In a motor vehicle, spaced longitudinal frame members for supporting the vehicle, a header member forming a cradle structure, including pairs of spaced opposed upwardly and outwardly extending support struts, transverse plates extending between the lower ends of said struts, said pairs of struts being disposed in longitudinal alignment, a pad member extending between said transverse plates, the upper ends of said struts being disposed in longitudinal alignment and disposed on one end of said transverse plates being secured to one of said frame members, the upper ends of said strut members in longitudinal alignment disposed on the opposite end of said transverse plates being secured to another of said frame members, longitudinal torsion rods extending through said struts and being pivotally supported therein, an upper wheel control arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing carried by said vehicle header member, yoke members connected to said differential housing, and wheel drive means connected to said yoke members for driving the wheels of the vehicle whereby said drive means may be readily disconnected from the wheels.

6. In a motor vehicle, a frame for supporting the vehicle, a header member forming a cradle structure comprising pairs of angular vertical struts spaced in longitudinal alignment, each pair of struts being spaced in transverse alignment, horizontal U-shaped transverse plates extending between each pair of struts, a longitudinal pad extending between said transverse plates, longitudinal flat plates extending between the upper ends of the struts that are disposed on the same side of said header member, one longitudinal flat plate being secured to one of said frame members and another of said flat plates being secured to another of said frame members, longitudinal torsion rods extending through said struts and being pivotally supported therein, an upper wheel control arm fixedly connected to each said rod between said struts, a socket housing on the outer end of each said arm for connection to a wheel, lower wheel control arms connected between said transverse plates, and a socket housing on the outer end of each lower arm for connection to a wheel, a differential housing disposed on and carried by said header member, yoke members connected to said housing, intermediate wheel drive shafts connected to said yoke members, and wheel stub shafts connected to said intermediate shafts for driving the wheels of a vehicle whereby said shafts may be readily disconnected from the wheels.

7. In a motor vehicle, spaced longitudinal frame members for supporting portions of the vehicle, a header member forming a cradle structure and including pairs of spaced opposed upwardly and outwardly extending support struts, transverse plates extending between the lower ends of said struts, said pairs of struts being disposed in longitudinal alignment, a pad member extending between said transverse plates, the upper ends of said struts being disposed in longitudinal alignment with plate members extending between the upper ends of adjacent struts, said last-mentioned plate members each being connected with one of said frame members for supporting the header member in depending relationship from said frame members, a differential housing supported by said pad member, a pair of longitudinal torsion rods extending through said struts and being pivotally supported therein, an upper wheel control arm fixedly connected to each of said rods between said struts, a socket housing on the outer end of each of said upper wheel control arms for connection to a wheel, a pair of lower wheel control arms connected between said transverse plates, a socket housing on the outer end of each of said lower arms for connection to a wheel, a pair of spindle sleeves each of which includes inwardly extending lugs, one of the lugs on each spindle sleeve being connected with a socket housing connected with one of said upper wheel control arms, the other lug of each of said spindle sleeves being connected with the socket housing connected with one of the lower wheel control arms, a wheel hub being rotatably supported on said spindle sleeve, a wheel shaft being rotatably supported within said spindle sleeve and being drivingly connected with said wheel hub through a splined connection, a universal joint assembly being operatively connected with opposite sides of said differential housing, an intermediate wheel drive shaft drivingly connected with each of said universal joint assemblies, and the other end portion of each of said intermediate wheel drive shafts being drivingly interconnected with one of said wheel shafts by means of a universal joint assembly.

References Cited by the Examiner

UNITED STATES PATENTS

| | | | |
|---|---|---|---|
| 2,128,660 | 8/1938 | Moorhouse | 180—43 |
| 2,137,848 | 11/1938 | Macbeth | 280—106.5 |
| 2,212,453 | 8/1940 | Perkins | 180—45 |
| 2,477,090 | 7/1949 | Roeder et al. | 180—43 |
| 2,746,556 | 5/1956 | Nallinger et al. | 180—42 X |
| 2,775,307 | 12/1956 | Hill | 180—43 |
| 2,858,142 | 10/1958 | Schjolin et al. | 180—42 X |
| 2,929,639 | 3/1960 | Barenyi et al. | 280—106.5 |

FOREIGN PATENTS

| | | |
|---|---|---|
| 1,006,192 | 1/1952 | France. |
| 494,415 | 10/1938 | Great Britain. |
| 271,017 | 12/1950 | Switzerland. |

A. HARRY LEVY, *Primary Examiner.*